United States Patent
Richards

(10) Patent No.: US 10,154,236 B2
(45) Date of Patent: Dec. 11, 2018

(54) ACOUSTO-OPTIC BEAM STEERING MODULATOR FOR A PROJECTION SYSTEM

(71) Applicant: Dolby Laboratories Licensing Corporation, San Francisco, CA (US)

(72) Inventor: Martin J. Richards, Redwood City, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/102,325

(22) PCT Filed: Dec. 5, 2014

(86) PCT No.: PCT/US2014/068778
§ 371 (c)(1),
(2) Date: Jun. 7, 2016

(87) PCT Pub. No.: WO2015/088902
PCT Pub. Date: Jun. 18, 2015

(65) Prior Publication Data
US 2017/0034486 A1 Feb. 2, 2017

Related U.S. Application Data

(60) Provisional application No. 61/914,045, filed on Dec. 10, 2013.

(51) Int. Cl.
*H04N 9/31* (2006.01)
*G03B 21/00* (2006.01)
(Continued)

(52) U.S. Cl.
CPC ............ *H04N 9/3126* (2013.01); *G02F 1/33* (2013.01); *G03B 21/005* (2013.01);
(Continued)

(58) Field of Classification Search
CPC .... H04N 9/3102; H04N 9/312; H04N 9/3126; G02F 1/33; G02F 1/332; G02F 1/335;
(Continued)

(56) References Cited

U.S. PATENT DOCUMENTS 3,609,009 A  9/1971 Lohman
3,746,866 A  7/1973 Feichtner
(Continued)

FOREIGN PATENT DOCUMENTS

JP  60-19027  2/1985
JP  S62-121427  8/1987
(Continued)

OTHER PUBLICATIONS

Riza, Nabeel A. "Acousto-optic Null-Steering Adaptive Photonic Processor Architectures for Phased Arrays" Proc. of SPIE—The International Society for Optical Engineering, v. 2754, pp. 95-102, 1996.
(Continued)

*Primary Examiner* — Loha Ben

(57) ABSTRACT

An Acoustic-Optic A/O device receives light from a source and deflecting the light onto the second A/O device which may be a multi-stacked set of individual A/O devices. The first and second devices may deflected light according to control signals. Also, a multi-modulator projector display system including a light source, controller, an A/O modulator illuminated by the light source and capable of deflecting light according to controller signals, a second modulator illuminated by light from said A/O modulator and capable of modulating the A/O modulated light, said second modulator comprising a plurality of mirrors, and said second modulator capable of modulating the light according to controller signals.

11 Claims, 4 Drawing Sheets

(51) Int. Cl.
*G02F 1/33* (2006.01)
*G02B 26/10* (2006.01)

(52) U.S. Cl.
CPC .......... *G02B 26/101* (2013.01); *G03B 21/008* (2013.01); *H04N 9/3102* (2013.01)

(58) Field of Classification Search
CPC .. G02B 26/101; G03B 21/005; G03B 21/008; H01S 3/005; H01S 3/0085; B23K 26/0626; B23K 26/064; B23K 26/0648
USPC .... 359/21, 237, 305, 307, 310, 559; 345/22, 345/32; 250/234
See application file for complete search history.

(56) References Cited

U.S. PATENT DOCUMENTS

| | | | |
|---|---|---|---|
| 3,799,652 A | 3/1974 | Torguet | |
| 3,944,948 A | 3/1976 | Redman | |
| 3,998,521 A * | 12/1976 | Eschler | G02F 1/33 359/21 |
| 4,455,485 A * | 6/1984 | Hosaka | G02B 26/108 250/234 |
| 4,736,110 A | 4/1988 | Awamura | |
| 4,827,125 A * | 5/1989 | Goldstein | G02B 21/0036 250/216 |
| 4,833,681 A * | 5/1989 | Akiyama | G01J 9/04 372/26 |
| 4,872,746 A * | 10/1989 | Kobayashi | G02F 1/113 359/305 |
| 5,012,089 A * | 4/1991 | Kurusu | H04N 1/047 250/235 |
| 5,086,341 A | 2/1992 | Tamada | |
| 5,105,304 A * | 4/1992 | Tanaka | G02F 1/11 348/769 |
| 5,191,339 A * | 3/1993 | Riza | H01Q 3/22 342/368 |
| 5,267,188 A | 11/1993 | Pape | |
| 5,579,161 A * | 11/1996 | Sekiguchi | G02B 27/0101 359/559 |
| 5,623,360 A | 4/1997 | Gesell | |
| 5,736,958 A * | 4/1998 | Turpin | G01S 7/20 342/179 |
| 5,910,262 A * | 6/1999 | Baumgart | B23K 26/067 219/121.68 |
| 6,172,799 B1 | 1/2001 | Raj | |
| 6,201,565 B1 * | 3/2001 | Balogh | G02B 27/22 348/40 |
| 6,236,479 B1 | 5/2001 | Gosselin | |
| 6,281,948 B1 | 8/2001 | Deter | |
| 6,329,966 B1 * | 12/2001 | Someya | G09G 3/02 345/22 |
| 6,539,132 B2 | 3/2003 | Ivtsenkov | |
| 6,618,178 B2 | 9/2003 | Engelhardt | |
| 6,751,009 B2 | 6/2004 | Khoshnevisan | |
| 7,046,266 B1 * | 5/2006 | Retschke | G03F 7/203 347/239 |
| 7,133,187 B2 * | 11/2006 | Johnson | B23K 26/0626 219/121.6 |
| 7,133,188 B2 * | 11/2006 | Johnson | B23K 26/0626 219/121.6 |
| 7,221,503 B2 * | 5/2007 | Eberhardt | G01N 21/6458 359/212.1 |
| 7,374,287 B2 * | 5/2008 | Van de Velde | A61B 3/102 351/221 |
| 7,443,567 B2 | 10/2008 | Duncan | |
| 7,561,328 B2 | 7/2009 | Awamura | |
| 7,826,130 B2 * | 11/2010 | Schweitzer | G02F 1/11 359/305 |
| 8,125,702 B2 | 2/2012 | Ward | |
| 8,848,200 B2 * | 9/2014 | Feldkhun | G01B 9/02082 356/496 |
| 8,848,277 B2 * | 9/2014 | Sandstrom | H01S 3/08 359/237 |
| 9,310,184 B2 * | 4/2016 | Feldkhun | G01B 9/02082 |
| 9,684,076 B1 * | 6/2017 | Feldkhun | G01S 17/89 |
| 2006/0018182 A1 | 1/2006 | Kieffer | |
| 2008/0100901 A1 | 5/2008 | Duncan | |
| 2009/0147344 A1 | 6/2009 | Lovering | |
| 2010/0284024 A1 | 11/2010 | Vucinic | |
| 2011/0273688 A1 | 11/2011 | Van Resandt Roelof Wijnaendts | |
| 2013/0044360 A1 | 2/2013 | Heinemann | |
| 2013/0148037 A1 | 6/2013 | Whitehead | |

FOREIGN PATENT DOCUMENTS

| | | |
|---|---|---|
| JP | H02-196214 | 8/1990 |
| JP | 2004-144816 | 5/2004 |
| JP | 2008-164774 | 7/2008 |
| JP | 2009-506365 | 2/2009 |

OTHER PUBLICATIONS

Barocsi, A. et al "Two-Dimensional Acoustooptic Light Diffraction and its Applications" Integrated Computer-Aided Engineering, v. 3, No. 2, pp. 108-116, 1996.

Barocsi, A. et al "Matrix Operations Utilizing Multichannel Two-Dimensional Acousto-Optic Deflector" Proc. of SPIE—The International Society for Optical Engineering, vol. 2051, pp. 386-393, 1994.

Kim, Sangtaek, "Acousto-optic Devices for Optical Signal Processing and Quantum Computing" ProQuest, UMI Dissertations Publishing, 2008.

St. Hilaire, P. et al "Real-time holographic Display: Improvements Using a Multichannel Acousto-Optic Modulator and Holographic Optical Elements" Proc. of SPIE—The International Society for Optical Engineering, v. 1461, pp. 254-261, 1991.

Graves, David W. "Sixty-four Channel Acousto-Optical Bragg Cells for Optical Computing Applications" Proc. SPIE 1563 Optical Enhancements to Computing Technology, Dec. 1, 1991 vol. 1563.

Kulakov, S.V. et al "Spatial and Angular Multiplexing by an Acousto-Optic Deflector Device for a Holographic Memory System" Proc. SPIE 3470, Photorefractive Fiber and Crystal Devices: Materials, Optical Properties, and Applications, Oct. 9, 1998, vol. 3470.

Psaltis, D. "Two-Dimensional Optical Processing Using One-Dimensional Input Device" Proc. of the IEEE, vol. 72, Issue 7, published in 1984, pp. 962-974.

Bardos, A. "Wideband Holographic Recorder" Appl. Opt. Apr. 1, 1974.

* cited by examiner

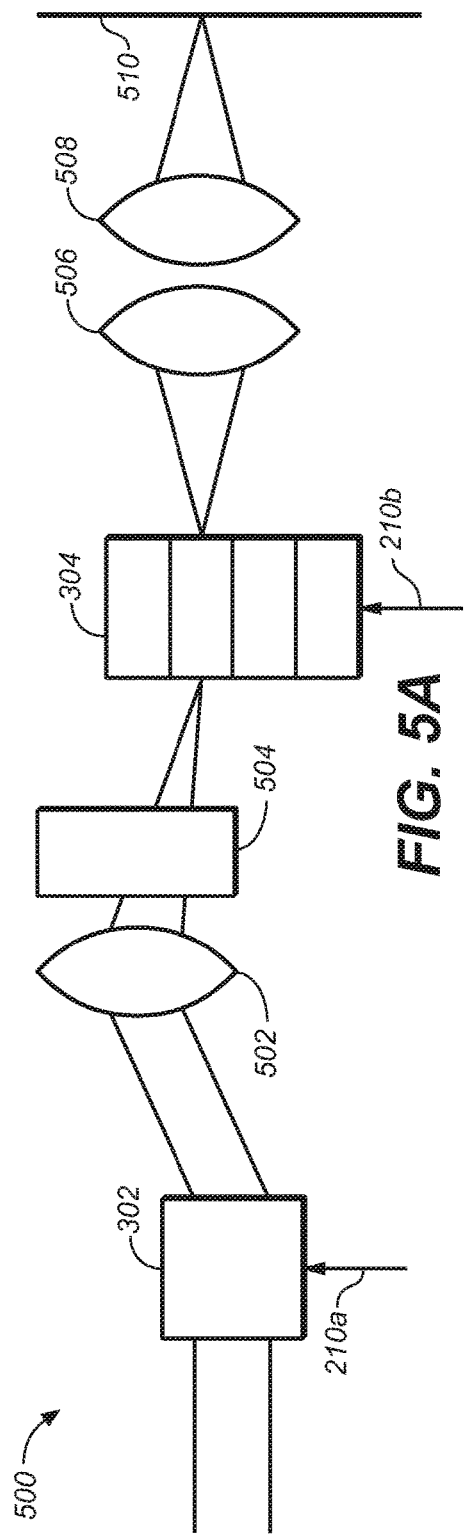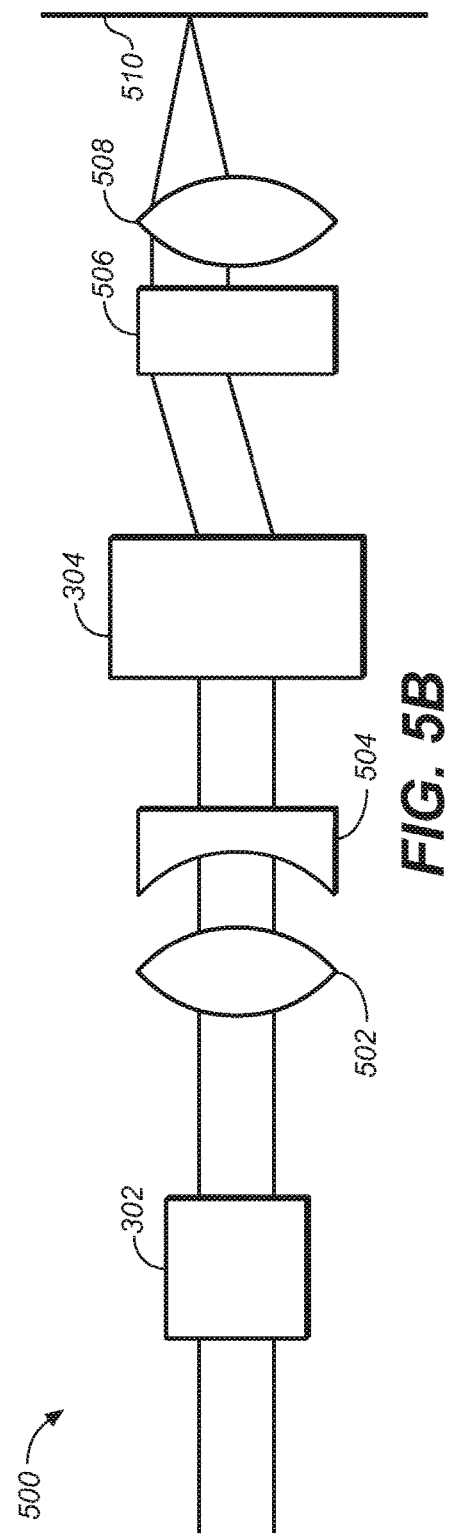

ACOUSTO-OPTIC BEAM STEERING MODULATOR FOR A PROJECTION SYSTEM

CROSS-REFERENCE TO RELATED APPLICATIONS

This application claims priority from U.S. Provisional Patent Application No. 61/914,045 filed 10 Dec. 2013, which is hereby incorporated by reference in its entirety.

TECHNICAL FIELD

The present invention relates to projector displays systems and, more particularly, to modulators for dual or multi-stage modulation projection display systems.

BACKGROUND

In a conventional projector system, there is typically a single light source that illuminates a screen with an image that is modulated by some optical system within the projector. When there is an image to be projected that has a "highlight" (that is, a region of high brightness e.g., a specular reflection off of a surface in the image, direct sunlight, a luminant object, one region that is substantially more luminant than other regions or the like), then the highlight would have the same luminance level as the "full" screen. In that case, the light coming through the projector would have to be fully ON for the entire screen and the projector system would have to "throw away" light that is not a part of the highlight. This may not tend to be the most-efficient use of the light source.

To address some of these inefficiencies, dual or multi-modulator projector systems are being proposed as a novel way of projecting images and video.

SUMMARY

Several embodiments of display systems and methods of their manufacture and use are herein disclosed.

An Acousto-Optic (A/O) modulator comprising a first A/O device and a second A/O modulator is disclosed. The first A/O device receives light from a source and deflecting the light onto the second A/O device. The second A/O device may be a multi-stacked set of individual A/O devices. The first and the second A/O devices may deflect light according to control signals, 210a and 210b, from controller 210, may be shown in FIGS. 2, 3A, 4 and 5A. Control signals 210a and 210b may be sent along two separate control lines (as shown).

In another aspect, a multi-modulator projector display system is described comprising: a light source; a controller; an A/O modulator, said A/O modulator being illuminated by said light source and capable of deflecting light according to control signals from said controller; a second modulator, said second modulator being illuminated by light from said A/O modulator and capable of modulating light from said A/O modulator, and said second modulator comprising a plurality of mirrors; and further wherein said second modulator capable of modulating the light according to control signals from said controller.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 5A and 5B depict a side view and a top view, respectively, of one alternative embodiment of an A/O modulator with multiple lenses in the optical path.

DETAILED DESCRIPTION

Figure 1:
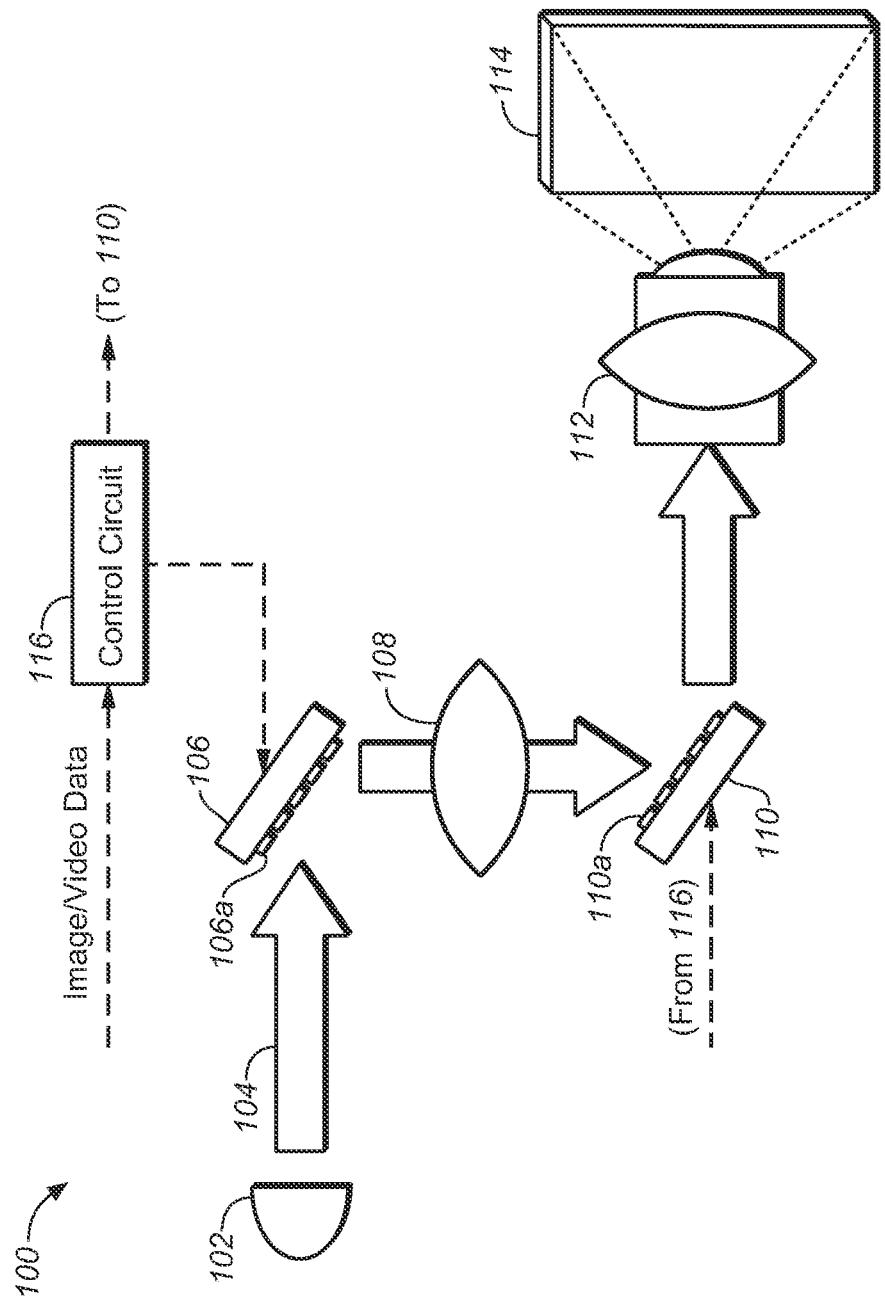
FIG. 1 is one embodiment of a dual modulation projector display system that may substitute its first modulator with an A/O modulator as disclosed further herein.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

Dual modulation projector systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";

(2) United States Patent Application 20130148037 to Whitehead et al., published on Jun. 13, 2013 and entitled "PROJECTION DISPLAYS"

which are hereby incorporated by reference in their entirety.

In many dual, triple, more than 2-modulation (all of which are hereinafter referred to as "multi-modulation") display systems disclosed herein use beam steering to put light on the modulation chips only where needed.

FIG. 1 is one embodiment of a dual modulating projector display system 100, comprising two or more digital projectors (as modulators). FIG. 1 shows a monochrome display 102 according to this example embodiment. Display 100 comprises a light source 102. Light 104 from light source 102 illuminates a first light modulator 106. Light source 102 may comprise, for example: a laser; a xenon lamp; an array of lasers (e.g., diodes or otherwise) or other solid-state light emitters; an arc lamp; or the like.

In one embodiment, the first light modulator 106 may comprise a plurality of controllable elements 106a e.g., on a fast switching devices, such as a MEMS device or the like. As will be described in greater detail below (and in reference to FIGS. 2A-B and FIGS. 3A-C), elements 106a may be selected such that they may be steered to reflect light to a second modulator 110 by a suitable control circuit/controller 116. The controller 116 may comprise a processor, a memory in communication with the processor and such that the memory may comprise instructions such that the controller may suitably control first modulator and second modulator (and other modulators, if they are in the system at issue) to perform the highlighting techniques as described herein.

The set of controllable elements may also comprises a set of controllable analog mirrors possibly with switching speeds sufficiently responsive to provide subframe rendering for processing highlights as described herein. In one embodiment, the switching response time of elements 106a may be fast enough so as to reflect light onto the second modulator several times in a given frame of image data. For example, elements 106a may affect a half frame, third frame, a quarter frame, or 1/n frame illumination onto second modulator 110, as desired.

Light from first modulator 106 may pass through an optical system 108—which may comprise sufficient optical components to perform a desired point spread function (PSF) of illumination onto second modulator 110. Depending on the ratio of elements 106a in first modulator 106 to elements 110a in second modulator 110, the desired PSF may vary accordingly. For example, if the first modulator 106 is a MEMS array and second modulator 110 is a DMD array, a typical MEMS array has many less elements 106a (e.g., range from a few hundred to a few thousand mirror elements, 100 to 2-3K) than a DMD array that may be a few million mirror elements thereon (e.g. over 500K mirrors and over).

Second light modulator 110 may be controlled by control circuit 116 (as first light modulator 106 may be) and comprise a plurality of controllable elements 110a. Each controllable element 110a can be controlled to select a proportion of the light that is incident on the element 110a from first spatial light modulator 106 that is transmitted to a viewing area 114 (through, possibly a second optical system 112).

In some embodiments, second spatial light modulator 110 comprises optical reflective or transmissive elements 110a that can be switched between ON and OFF states, e.g., a DMD device. In such embodiments, second spatial light modulator 110 may be controlled by a controller that sets its elements to be ON or OFF.

Transfer optics 108 carries light from first light modulator 106 to second light modulator 110. This light is capable of illuminating the entire active area of second light modulator 110 when all elements 106a of first spatial light modulator 106 are ON. This light could spread past the edges of second spatial light modulator 110. Transfer optics 108 may blur the light. Transfer optics 108 may be characterized by a transfer function which at least approximates how light issuing from a point on first spatial light modulator 106 will be spread over second spatial light modulator 110. The pattern of light incident on second light modulator 110 can be estimated or determined from the configuration of first modulator 106 (i.e. from which elements 106a are ON and which elements 106a are OFF) and the transfer function. A suitable projection lens 112 focuses light from second spatial light modulator 110 onto a screen 114 for viewing. Screen 114 may comprise a front-projection screen or a rear-projection screen.

Although the embodiment of FIG. 1 depicts a single light channel, it will be appreciated that the first and second modulators may be replicated for each of a series of color channels within the projector such that each color channel includes 2 optically offset reflective modulators. The series of color channels may comprise a red channel, a green channel, and a blue channel. The light source may comprise, for example, a plurality of colored laser light sources. In one embodiment, the light sources may be modulated either globally (in brightness) and/or spatially (locally) dimmed according to signals (not shown) from a controller (e.g., 116).

The intermediate signals to the second modulator may be, for example, based on a light field simulation comprising a point spread function of light reflected by the first modulator and the offset. For example, the intermediate signals to the second modulator may be based on a point spread function of light reflected by the first modulator in each channel and the offset in each channel. The offset in the channels may be the same, or the offset of at least two channels is different and the intermediate signals to second modulator in each channel is based on at least one of the offset and differences in offset between channels.

Acousto-Optic Beam Steering Modulator Embodiments

As mentioned above, the first modulator may be a MEMS array and a typical MEMS array has a limited number of reflective elements (e.g., a few hundred to a few thousand). As a result, it may be desirable to find an alternative to a MEMS array as a first (or pre-) modulator for such a dual (or multi-) modulator projector system.

In the projector systems of FIG. 1, the EDR projector may employ a "brute force" dual modulation approach to obtaining bright high contrast images. Using this method, the full screen and highlight luminance levels are equal, but it may be inefficient. Other embodiments of projector systems may employ triple modulation approaches that uses beam steering to put light on the modulation chips only where needed. Conceptually this may work well, as only a small percentage of the energy is required for the highlights; however, at present, there are no commercially available beam steering devices with nearly enough mirrors. The optimal number is over 1500, and the largest devices have around 200. The concept of beam steering is described in the attached document. In one embodiment, it may be possible to use triple modulation, with the beam steering imaged onto a first DMD pre-modulator along with some base (flat) illumination.

Thus, several embodiments of the present application may address these issues by replacing a first modulator comprising beam-steering mirror with an Acousto-Optic (A/O) modulator and/or deflector. In some embodiments, this A/O modulator may comprise two or more A/O devices. In that case, the A/O modulator may further comprise a single A/O device (which may be capable of handling a lot of power, but may have a low Time Bandwidth Product (TBP)), and a second, multichannel A/O deflector.

Figure 2:
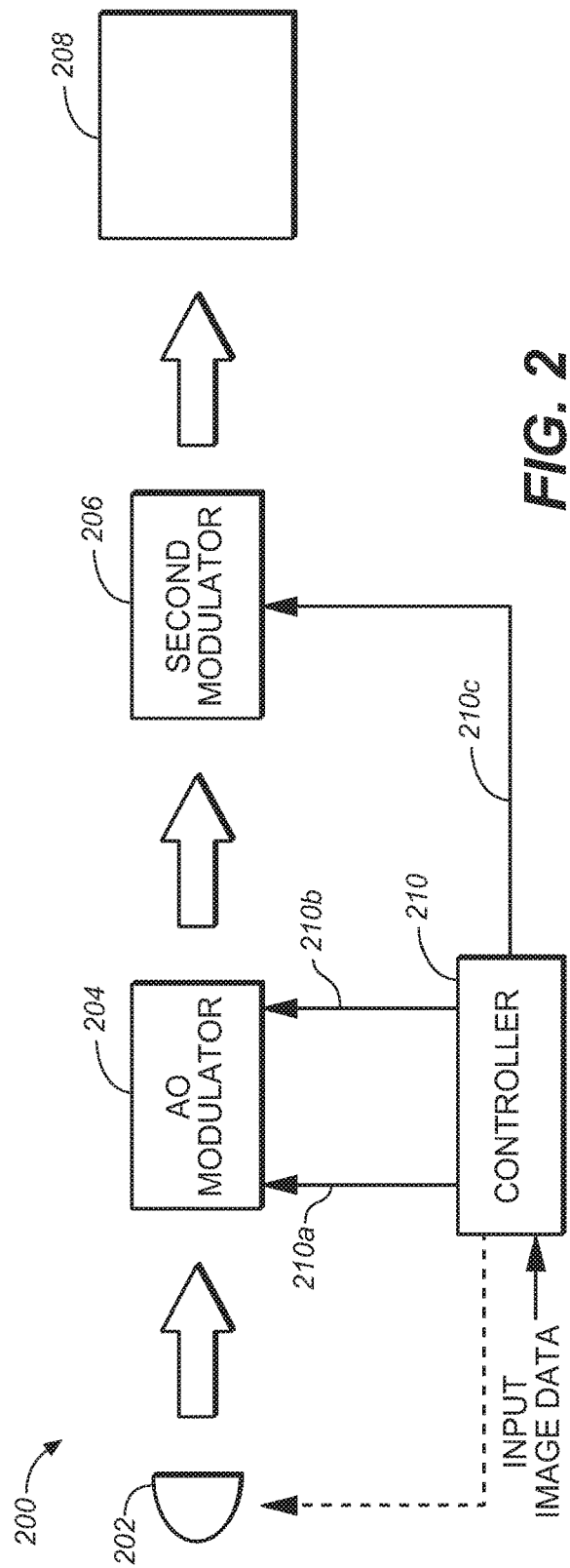
FIG. 2 depicts a high level schematic description of a projector system comprising an A/O modulator as a first (or pre) modulator as made in accordance with the principles of the present application.

FIG. 2 depicts a high level block diagram of a projector system 200 that comprises such an A/O modulator 204. Light from a source 202 may be input into A/O modulator 204 which may be controlled by controller 210 to illuminate the reflectors of the second modulator 206 (e.g. a DMD array or the like). Light from second modulator 206 may ultimately be used to form a projected image onto a screen 208. Controller 210, as shown, may be constituted to provide control signals to the A/O modulator 204 (via control lines 201a and/or 201b)and the second modulator 206 (via control line 210c) or optionally to the light source 202 itself, depending upon input image data.

Figure 3A:
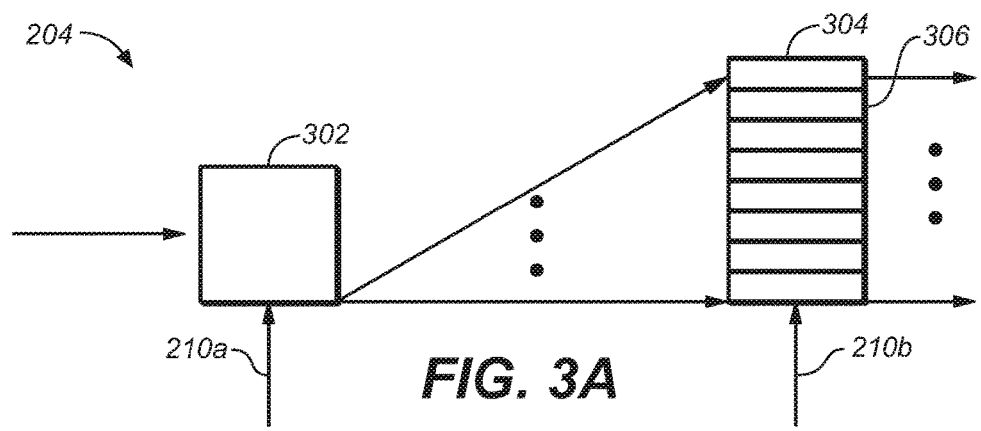
FIGS. 3A and 3B depict a side view and a top view, respectively, of one embodiment of an A/O modulator as made in accordance with the principles of the present application.
Figure 3B:
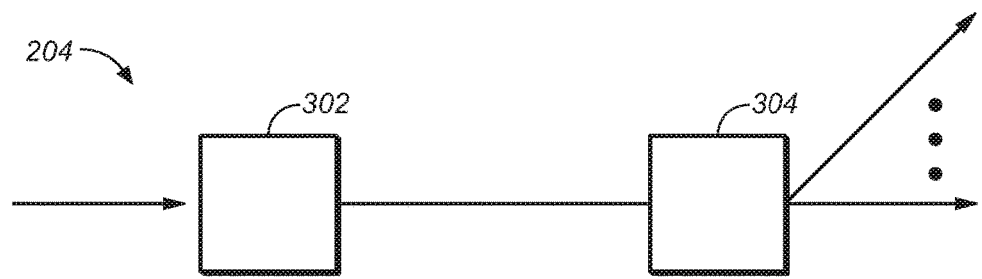

FIGS. 3A and 3B depict a side view and a top view, respectively, of a suitable A/O modulator 204. As may be seen, a first A/O deflector 302 receives light from the optical path and may (e.g., under suitable control signal from a controller) deflect the incoming light to a second multichannel A/O modulator 304. In one embodiment, A/O modulator 304 may comprise a stack of a plurality of A/O devices 306. Light may be deflected from A/O modulator 304 (e.g., under suitable control signals from a controller) to a plurality of locations downstream e.g., to a second modulator (which may be a DMD array).

Alternative Embodiments

Figure 4:
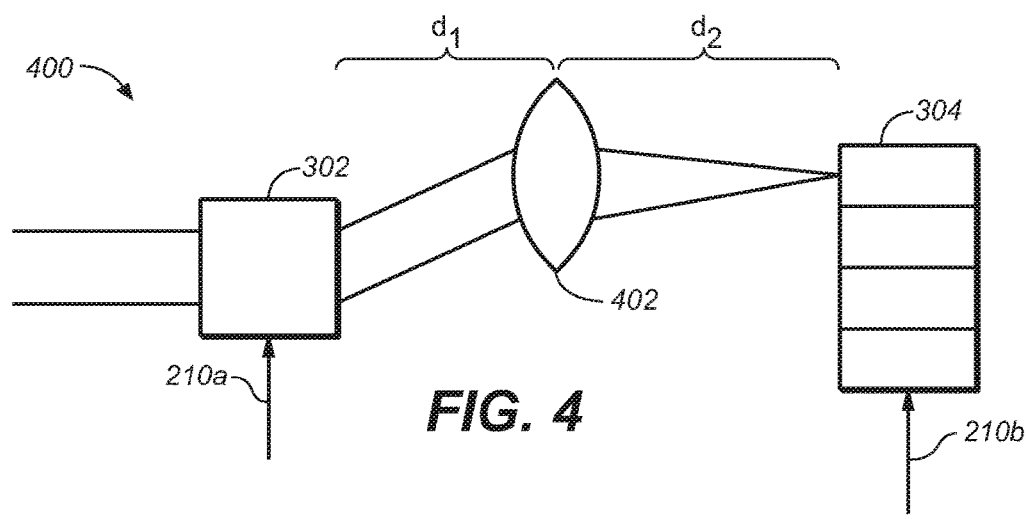
FIG. 4 is one alternative embodiment of an A/O modulator with a lens in the optical path.

FIG. 4 depicts a side view of one alternative embodiment of an A/O modulator 400. As before, A/O device 302 receives light and may deflect the light through to a lens 402 which, in turn, illuminates a second A/O device 304. If lens 402 is a Fourier Transform lens, then $d_1$ equals $d_2$. In that case, the transform of input light becomes well modeled in its behavior which may be desirable in many circumstances.

FIGS. 5A and 5B depict a side view and a top view of another embodiment of A/O modulator 500. A/O device 302 receives light and deflects it into lenses 502 and 504. In one embodiment, lens 502 may be a spherical lens and lens 504 may be a negative spherical lens (e.g., having no power). Light is thus focused onto one of many A/O devices in A/O stack 304. Light may thereafter be deflected into lenses 506 and 508. In one embodiment, lens 506 may be a lens having no power and lens 508 may be a spherical lens. Light may then be focused onto another element e.g., DMD array 510 for further modulation of light within the projector system.

Other Embodiments

As the various embodiments have demonstrated, it may be desirable to employ the concept for using an A/O deflector and Multi-Channel A/O deflector for beam steering. In many embodiments, the first A/O deflector may allocate a proportional amount of light to each of the channels in a second A/O multi-channel deflector, and provides for the vertical extent of the target (e.g., a DMD array). The multi-channel deflector may provide the horizontal modulation, a single stripe for each channel. In some embodiments, the system may employ a 6 channel multi-channel deflector, but other sizes may be 8, 16, and 32 channel arrays.

In some embodiments, total optical path length may be about a meter, with the deflectors operating at about 2.5 degrees of deflection. Total efficiency may be around 50-60%. In some embodiments, a collimated low Etendue source such as a laser may be employed. Such a system may allocate all of the light to a single location on the DMD within the constraints of the resolution of multichannel deflector and number of channels. These deflectors may have TBPs in excess of 200. For one example, if a 32 channel array was used, this would provide for 200 horizontal elements by 32 vertical elements, for a total of 6400 zones of illumination. In some beam steering embodiments, substantially all of the energy may be concentrated into a single zone.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. An acousto-optic (A/O) modulator comprising:
   a first A/O device, said first A/O device receiving light from a source and deflecting the light according to first control signals received from a controller; and
   a second A/O device, said second A/O device receiving the deflected light from said first A/O device and further deflecting the deflected light according to second control signals from the controller,
   wherein said second A/O device comprises a set of A/O devices and said first A/O device illuminates said set of A/O devices with said deflected light; and
   wherein further each of the A/O devices of the set of A/O devices illuminates a number of addressable targets.

2. The A/O modulator of claim 1, wherein said set of A/O devices comprises a set of stacked A/O devices such that said first A/O device deflects light onto a first direction, said first direction moving along an axis of the set of stacked A/O devices.

3. The A/O modulator of claim 2, wherein said each of the set of stacked A/O devices deflects light onto a second direction, said second direction substantially perpendicular to said first direction.

4. The A/O modulator of claim 1, wherein said A/O modulator further comprises:
   a Fourier transform lens, said Fourier transfer lens disposed substantially equidistance between said first A/O device and said second A/O device.

5. The A/O modulator of claim 1, wherein said A/O modulator further comprises:
   a first optical set, said first optical set disposed between said first A/O device and said second A/O device; and
   a second optical set, said second optical set disposed after said second A/O device.

6. The A/O modulator of claim 5, wherein said first optical set further comprises a spherical lens and a negative spherical lens; and
   said second optical set further comprises a negative spherical lens and a spherical lens.

7. The A/O modulator of claim 1, wherein said addressable targets comprise mirrors of a DMD array.

8. A multi-modulation projector display system, said display system comprising:
   a light source;
   a controller;

an A/O modulator, said A/O modulator being illuminated by said light source and deflecting light from said light source according to first control signals from said controller; and a second modulator, said second modulator being illuminated by light from said A/O modulator and modulating the light from said A/O modulator, and said second modulator comprising a plurality of mirrors, wherein said second modulator is energized for modulation according to second control signals from said controller.

9. The display system of claim 8, wherein said A/O modulator further comprises:

a first A/O device, said first A/O device receiving the light from the source and deflecting the light according to the first control signals received from said controller; and a second A/O device, said second A/O device receiving the deflected light from said first A/O device and further deflecting the deflected light according to the second control signals from the controller, wherein said second A/O device comprises a set of A/O devices and said first A/O device illuminates said set of A/O devices with said deflected light, and wherein each of the A/O devices of the set of A/O devices illuminates a number of addressable targets.

10. The display system of claim 9, wherein said set of A/O devices device further comprises a set of stacked A/O devices such that said first A/O device deflects light onto a first direction, said first direction moving along an axis of the set of stacked A/O devices.

11. The display system of claim 10, wherein said each of the set of stacked A/O devices deflects light onto a second direction, said second direction substantially perpendicular to said first direction.

* * * * *